Feb. 21, 1933.  E. G. RAGATZ  1,898,572
METHOD AND APPARATUS FOR CONTROLLING TEMPERATURES
Filed Jan. 28, 1929
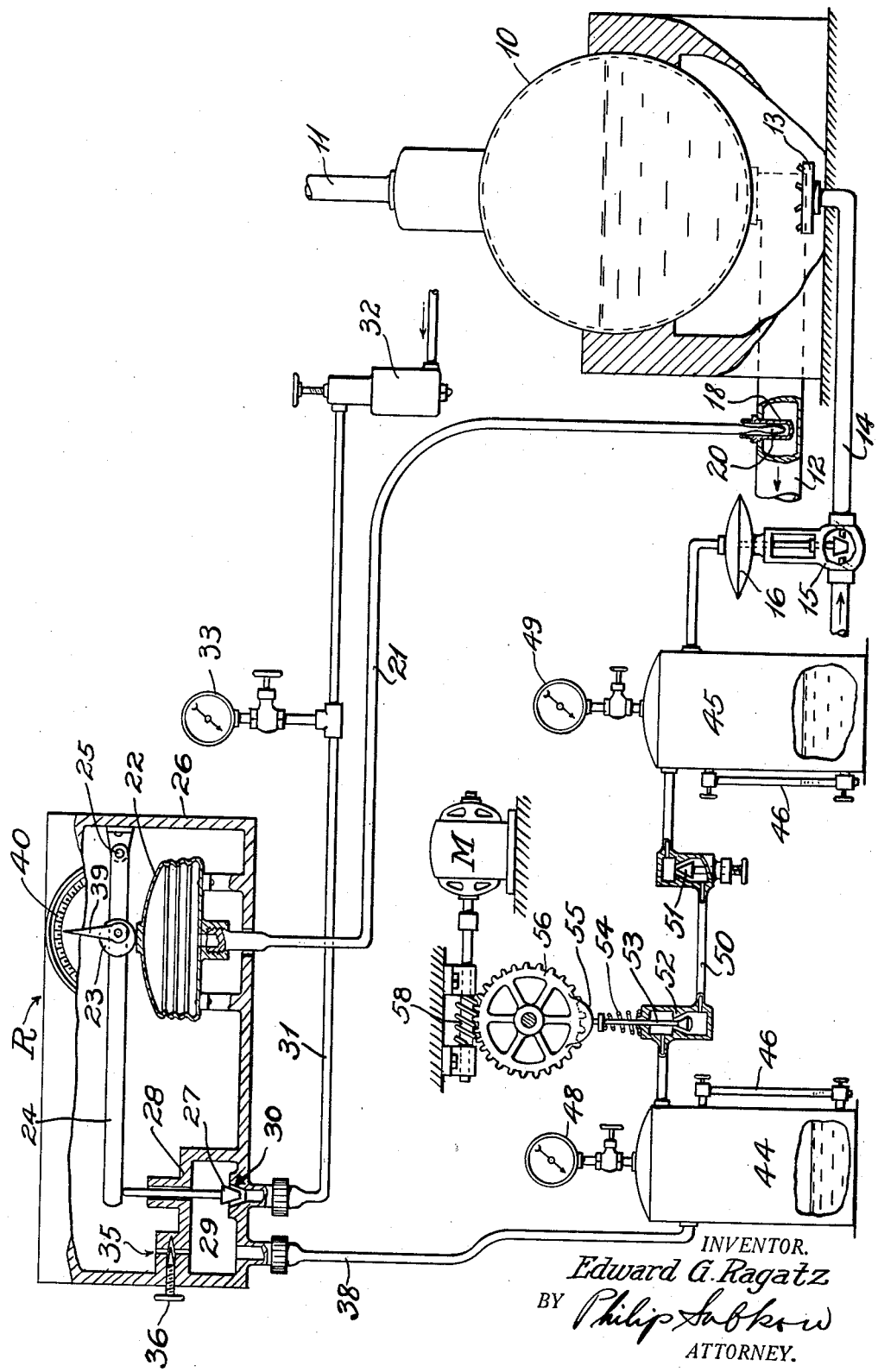
INVENTOR.
Edward G. Ragatz
BY Philip Subkow
ATTORNEY.

Patented Feb. 21, 1933

1,898,572

UNITED STATES PATENT OFFICE

EDWARD G. RAGATZ, OF BERKELEY, CALIFORNIA, ASSIGNOR TO UNION OIL COMPANY OF CALIFORNIA, OF LOS ANGELES, CALIFORNIA, A CORPORATION OF CALIFORNIA

METHOD AND APPARATUS FOR CONTROLLING TEMPERATURES

Application filed January 28, 1929. Serial No. 335,604.

This invention relates to devices particularly adapted to maintain a substantially constant temperature in various heat operated mechanisms such as stills employed in distilling petroleum, or similar units, wherein it is desired to maintain a substantially uniform temperature at some point in the system. Heretofore, when attempting to use a sensitive temperature controller on such a service, the natural time lag in the system between the time of changing the firing rate and the time that this change has made itself felt at the desired point of control, has been such as to produce an overcontrolling of the fuel valve with a resultant surging of the fuel supply. That is, the passage of fuel as effected by the temperature change has been excessively increased and later excessively decreased (or vice versa) so that there has been a resultant fluctuation of temperature, first to a higher point and then to a lower point than the desired average (normal). In other words, the temperature-sensitive regulator at one moment would pass too much fuel due to the mentioned lag, thus overheating the still. The regulator would then be oppositely influenced by the added heat and would reduce the fuel supply to too low an amount, resulting in underheating. This cycle would repeat indefinitely without arriving at the desired average. This has resulted in turn in an excessive variation of the application of heat to the stills, in poor combustion due to the resultant wide variation in the air-fuel ratios, and in periodic rather than even temperature control.

It is the primary object of the present invention to provide a controller capable of maintaining a substantially constant temperature in a still outlet or the like and to substantially or entirely eliminate overcontrol.

These results have been accomplished by the interposition between a pressure operated regulator and a diaphragm control valve, of an intermittently actuated device capable of transmitting pressure changes from the regulator to the control valve in small increments, the increment of pressure change at each stage being decreasingly smaller as equilibrium is approached between the new pressure established by the regulator and the pressure as previously applied to the control valve.

In a preferred construction a known type of regulator is employed wherein temperature changes act to vary the air pressure in a line serving to transmit these pressure changes to the fuel control valve, and in this line there is interposed a pair of pressure tanks between which an intermittently actuated valve mechanism is positioned, so that if a difference between the pressure in the two tanks develops, only a small quantity of gas will be permitted to pass between the two at any given interval of time following which there is a longer interval during which no gas passes. This longer interval provides an opportunity for the limited change in pressure upon the control valve to make its effect felt by a corresponding change in temperature in the still control point. Said longer interval of time having passed, the valve is again opened and if a pressure difference still exists between the two tanks, a momentary flow of gas will again take place. But since the pressure in the low pressure tank, by reason of the previous passage of gas, now presents a smaller difference between the two tanks than originally, the pressure increment for the second gas passage will be less than upon the first passage. Again a longer interval of no gas flow is permitted to enable the effects of the change upon the control valve to become effective at the point of control. In this manner small adjustments of pressure by successively decreasing pressure increments are made, intervals of time being allowed between such pressure adjustments to permit the effects of the adjustments to take place and thereby allow the still conditions to approach normal. Thus the over-firing of the still or the under-firing thereof, which would otherwise take place if the full effect of the pressure change produced by the regulator were transmitted to the control valve at once, is prevented, and the adjustment of the control valve is gradually brought to the proper point. This method of operation is very effective in view of the fact that it maintains still conditions very nearly constant.

Broadly stated, therefore, the invention resides in interposing between a sensitive regulator (such as a temperature sensitive regulator) for passing gas under pressure and a control valve actuated by such gas under pressure, an intermittently actuated device for transmitting pressure changes from the regulator to the control valve by stages. In the preferred form this intermittent transmission of pressure occurs in gradually decreasing increments, so that the effects are gradually applied to permit a gradual approach to normal conditions in a still or other device in connection with which constant temperatures are to be maintained.

In the accompanying drawing one embodiment of the above invention is disclosed by way of illustration in connection with its application to an oil still wherein control is obtained from the temperature of the residue in the outlet line and a gas pressure register is employed for eventually varying the pressure to a control valve on the fuel line to the still.

In the drawing an oil still 10 which may have a vapor take off 11 is provided with a residue outlet line 12, and the still is adapted to be heated by a burner 13 supplied through a fuel line 14 having a control valve 15 actuated by a diaphragm control 16. A thermometer well 18 disposed in the outlet line 12 receives a temperature sensitive element 20 which is connected through transmission line 21 with an expansion element 22 in a regulator or control head of known type and indicated generally as R. The element 22 is adapted to vary the pressure to a diaphragm control 16 for the valve 15, and this is accomplished by causing the element 22 to work against a cam member 23 adjustably mounted on a lever 24 pivoted at 25 on the casing 26 of the control head R. This lever 24 regulates the position of a valve 27 suitably guided in the housing 28 of a small chamber 29, to regulate the passage of gas, such as air, past the valve seat 30 from a constant pressure line 31 which continuously receives gas under pressure from any source by way of a pressure reducer 32. A gauge 33 enables the determination of the pressure in line 31. A leakage vent indicated at 35 and controlled if desired by means of a needle valve 36 provides for a slow continuous loss of gas from the small chamber 29 tending toward a steady drop of pressure in said chamber 29.

Any actual drop, if permitted by valve 27, or any rise passed by valve 27, is transmitted through a line 38 for eventually actuating the diaphragm mechanism 16 of the control valve 15. The regulator or control head R as above described being of a type known in the art, constitutes no part of the present invention. The cam 23 is adjustable on a lever 24 and through the medium of an indicator hand 39 is movable over a graduated dial 40 on the housing 26, the function of this adjustment being to control the position of the valve 27 for the passage of more or less gas under pressure from the line 31.

The present invention comprises the combination with a regulator or control head R of an intermittently actuating pressure controller placed in the line 38 between the regulator R and the diaphragm control 16 for the valve 15. This controller is in the form of two tanks 44 and 45 adapted to contain air or other gas under pressure received from the line 38. Inasmuch as it may be desirable to regulate the gas chamber of each tank for various equipments, a sight glass 46 is mounted upon each tank in order that predetermined amounts of liquid may be introduced into the respective tanks for change in the capacity of the gas chamber. A gauge 48 is provided to indicate the pressure in the line 38 and the tank 44, and another gauge 49 will indicate the pressure in the tank 45.

Extending between the tanks 44 and 45 is a connecting line 50 in which a valve 51 is positioned to control the rate of flow from one tank to the other and in which a second valve 52 is disposed to be intermittently actuated for the passage of gas through the line 50 intermittently at predetermined intervals. The valve element 53 in said valve member 52, according to a convenient arrangement, is normally urged to closed position by a spring 54 and is intermittently movable to open position by a cam element 55 carried on a gear wheel 56 driven by a worm 58 from a constant speed motor M.

In the operation of the device, the temperature change transmitted by the temperature sensitive element 20 in the thermometer well 18 to expansible member 22 to move the lever 24 and control the amount of gas passed by the valve 27 from the constant pressure line 31. Due to the leakage from the vent 35 the pressure in the small chamber 29 and in the line 38 and the tank 44 is normally maintained at a smaller value than that in the line 31. For example, the pressure in the line 31 will be carried at 15 pounds and that in the line 38 normally will be carried at 8 pounds, in a manner well known in the art. When the entire mechanism is in balance the pressure of 8 pounds in the tank 44 will also be maintained in the tank 45. When a temperature change felt by the temperature sensitive element 20 is transmitted to the valve 27 to pass more or less gas from the 15 pound line 31 a pressure change would be felt in the line 38 and if the connection of the line 38 with the diaphragm control 16 were direct, as heretofore practiced, said pressure change in the line 38 would be immediately transmitted to actuate the control valve 15 with the result that an excessive adjustment of the valve 15 and a resultant overcontrol would result.

In order to prevent such overcontrol the intermittently actuating mechanism between the tanks 44 and 45 serves to transmit the pressure change in the line 38 and tank 44 to the tank 45 in small increments, the pressure differential between the tanks 44 and 45 gradually decreasing for a given change transmitted by the valve 27, so that the amount of gas passed by the intermittently actuated valve 53 at each intermittent operation will be successively decreased; or it may be otherwise stated that the increments in pressure change will successively decrease. It will be seen that this result is accomplished by reason of the fact that the cam 55 rotated with the wheel 56 by the constant speed motor M will engage and actuate the valve 53 at uniformly spaced intervals of time, thus permitting gas to flow from the high pressure tank 44 or 45 to the low pressure tank.

As an example of operation, suppose that with the controller in balance at 8 pounds pressure in both tanks 44 and 45, an undesired rise in still temperature acts through the regulator to move the valve 27, resulting in a rise in pressure in the tank 44 from 8 pounds to 12 pounds, and that the wheel 56 and its cam 55 are rotated once a minute. At the first operation of the valve 53 a small amount of gas will pass from the tank 44 under 12 pounds pressure to tank 45 which is under 8 pounds pressure. The valve 51 will restrict the flow of gas, and the valve 53 will control the interval of time during which the gas will flow. Assume that during the period that the valve 53 is open, the pressure in the tank 45 rises one pound, thus bringing pressure of tank 45 to nine pounds. Valve 15 will be operated accordingly to reduce the fuel supply to burner 13. An interval of one minute will then be allowed for the conditions in the still 10 to adjust themselves so as to cool the materials in the outlet line 12. If after the lapse of one minute the temperature at the control point is still too high, when valve 53 is again opened, an additional amount of gas will pass from the tank 44 to the tank 45. But said temperature will be at least somewhat lower than when the regulator first went into operation, and the pressure in tank 44 will have dropped accordingly probably to around eleven pounds. Now in view of the fact that the pressure differential in the two tanks at this time is only two pounds as against a four pound differential at the previous operation, the rise in pressure in tank 45 at this operation will be less than at the first operation. This second pressure increment for example may be about one-half pound, thus bringing the pressure in tank 45 to nine and one-half pounds. Another lapse of a minute will then be allowed for further adjustment of conditions in the still 10, and until conditions do become fully adjusted these intermittent adjusting operations will be repeated. Ordinarily the conditions which caused the temperature increase or temperature drop, as the case may be, will be overcome in a few minutes, and the full application of the pressure change effected by the regulator will never be transmitted to the tank 45 and the control valve 15. Hence, the apparatus will settle down to a new balance, and overcontrol will be largely or entirely prevented.

However, if it should be that some overcontrol did take place, then the final balance would work back toward the original operating pressure of eight pounds, the pressure drops would still be gradually transmitted, the corresponding effects on the fuel supply likewise would be gradually transmitted, and overcontrol in this direction also would be avoided.

It is to be understood that the construction and operation herein specifically disclosed are only illustrative of the generic invention which may be variously modified within the scope of the appended claims by those skilled in the art.

I claim:

1. A temperature control mechanism comprising in combination a temperature sensititve regulator to pass control gas under pressure in varying amounts as temperature fluctuates, a valve to be controlled by such pressure gas, and an intermittently actuating device between the valve and the regulator to transmit by stages those pressure changes passed by the regulator, and means to transmit to the valve at each stage a pressure change materially less than the whole change.

2. In combination a temperature sensitive regulator to pass gas under pressure, means to be controlled by such pressure gas, and a controller comprising means for transmitting pressure changes from the regulator to the controlled means intermittently in successive increments, and means to pass at each increment an effect materially less than the whole change passed into the controller from the regulator.

3. In combination a regulator for establishing a variable gas pressure under varying conditions, a controlled device actuable by changes in such gas pressure and means for transmitting a pressure change to said device intermittently in stages, said pressure transmitting means including means to pass only a portion of the effect of each stage materially less than the whole effect thereof.

4. A construction according to claim 3 wherein the transmitting means passes the pressure change by gradually decreasing increments.

5. A construction according to claim 2 wherein the transmitting means passes a pressure change by increments decreasing in value.

6. A method for controlling temperature where temperature changes cause corresponding changes in the pressure of a controlling gas passed to a device to be controlled, comprising transmitting a given pressure change to the controlled device in successive increments at spaced intervals, each increment being less than the whole change transmitted at the corresponding interval.

7. A method according to claim 6 wherein the successive increments in pressure change are gradually decreased in value with respect to each preceding increment.

8. A method for temperature control, comprising employing temperature changes to effect corresponding changes in pressure in a controlling gas pressure applied to a device to be controlled, comprising transmitting only a portion of each pressure change, checking further transmission of such pressure change for an appreciable interval of time, then transmitting another portion of the pressure change, again checking transmission of the change for an appreciable interval of time, and repeating such control steps until a balance is obtained.

9. A method for temperature control according to claim 8 wherein the pressure increment at each successive pressure transmission is less than the preceding increment.

10. In temperature control mechanism, a temperature sensitive pressure regulator for a controlling gas pressure, a controlled device to which such gas pressure is to be transmitted, said regulator causing changes in the gas pressure as the temperature varies, and a controller between the regulator and the controlled device comprising an intermittently actuated device for passing a pressure change in a plurality of small increments, and means for rendering each increment less than the whole effect.

11. A temperature control mechanism comprising a pressure regulator sensitive to temperature changes for varying gas pressure, according to temperature change, a valve control actuable by such gas pressure, and a controller between said valve and said regulator comprising a pair of gas tanks of relatively large capacity, one of which is in communication with said regulator and the other in communication with said valve control, a connection between said tanks, a valve in said connection, and means for intermittently opening said valve to pass gas from one tank to the other to transmit small pressure increments successively upon any change in pressure.

12. A temperature control mechanism comprising in combination a temperature sensitive regulator adapted to pass effects due to temperature fluctuation, a valve to be controlled under influence of such effects, and an independently actuating device between the valve and the regulator operating at predetermined intervals to transmit by corresponding stages effects of temperature changes passed by the regulator, and means for rendering each increment less than the whole effect.

13. In combination a regulator to pass effects of a change, means to be controlled by such effects, and means for transmitting such effects from the regulator to the controlled means intermittently in successive increments and operating independently of the occurrence of the effects, and means for rendering each increment less than the whole effect.

14. A regulating mechanism comprising the combination of a controlled device for governing application of an agent to an apparatus to be regulated, means actuated by changes in said apparatus due to said agent, and a controlling device between said means and said controlled device, said controlling device including means to transmit the effects of such a change in successive stages each less than the whole effect.

15. A temperature regulating mechanism comprising the combination of a controlled member capable of movement indicative of corresponding temperature changes for governing heat application to an apparatus to be regulated, means actuable by temperature changes in said apparatus, and a controlling device between said member and said means including means movable to transmit the effect of a temperature change in stages for moving the controlled member step by step toward the limit of movement corresponding to said change by successive increments each less than the whole movement corresponding to said change.

16. A combination comprising a controlled device subject to variations, means responsive to variations in said controlled device, means operatively connected to pass effects resulting from a variation in said controlled device from said responsive means to overcome a variation in said controlled device, and means operative to cause the passage of said effect in a plurality of steps each less than the full value of said effect.

Signed at Los Angeles, in the county of Los Angeles, and State of California, this 15th day of January, A. D. 1929.

EDWARD G. RAGATZ.